US012227389B2

(12) United States Patent
Goodwin

(10) Patent No.: US 12,227,389 B2
(45) Date of Patent: Feb. 18, 2025

(54) TELESCOPIC LINEAR OPERATOR

(71) Applicant: G.A.L. Manufacturing Company, LLC, Bronx, NY (US)

(72) Inventor: Andrew Goodwin, New York, NY (US)

(73) Assignee: G.A.L. Manufacturing Company, LLC, Bronx, NY (US)

( * ) Notice: Subject to any disclaimer, the term of this patent is extended or adjusted under 35 U.S.C. 154(b) by 0 days.

(21) Appl. No.: 18/223,247

(22) Filed: Jul. 18, 2023

(65) Prior Publication Data

US 2025/0026613 A1 Jan. 23, 2025

(51) Int. Cl.
*B66B 13/08* (2006.01)
*E05F 15/643* (2015.01)

(52) U.S. Cl.
CPC ............ *B66B 13/08* (2013.01); *E05F 15/643* (2015.01)

(58) Field of Classification Search
CPC ..... E05F 15/643; E05F 15/632; E05F 15/635; E05F 15/641; E05F 15/649; E05F 15/652; B66B 13/08; B66B 13/30; B66B 13/143; B66B 13/06
See application file for complete search history.

(56) References Cited

U.S. PATENT DOCUMENTS 5,711,112 A * 1/1998 Barten .................. E05F 15/643 49/118
5,797,471 A * 8/1998 Princell ................... B66B 13/08 187/324
5,878,846 A * 3/1999 O'Donnell .............. B66B 13/08 187/334
6,490,832 B1 * 12/2002 Fischbach ........... E05D 15/0639 52/207
6,513,628 B2 * 2/2003 Mollenauer ............. B66B 13/30 187/334
8,424,244 B2 * 4/2013 Tarrega Lloret ...... E05F 15/643 49/118

(Continued)

FOREIGN PATENT DOCUMENTS

| | | | |
|---|---|---|---|
| EP | 0841285 A1 | | 5/1998 |
| EP | 2743226 A1 | | 6/2014 |
| WO | WO2022219641 | * | 10/2022 |

OTHER PUBLICATIONS

Extended European Search Report including Search Opinion from EP Appl. No. 24188025.1, dated Nov. 25, 2024, pp. 1-6.

*Primary Examiner* — Justin B Rephann
(74) *Attorney, Agent, or Firm* — Lerner David LLP

(57) ABSTRACT

A linear operator for a sliding door includes a body; a first wheel rotatably attached to the body at a first position on the body; an arm movably attached to the body, translatable in a direction parallel or substantially parallel to a longitudinal axis of the body, and fixable to the body at a desired translation position; a second wheel rotatably attached to the arm at a second position on the arm; and a conveyor extending between the first wheel and the second wheel, movable about the first wheel and the second wheel, and operable for attachment to a door, wherein when the arm is at a desired translation position, a distance between the first position and the second position corresponds to a desired movement distance of the door when the door is attached to the conveyor.

20 Claims, 3 Drawing Sheets

(56) References Cited

U.S. PATENT DOCUMENTS

| | | | | |
|---|---|---|---|---|
| 11,691,852 | B2 * | 7/2023 | Kashiwakura | B66B 13/06<br>187/315 |
| 2001/0047909 | A1 * | 12/2001 | Mollenauer | B66B 13/30<br>187/315 |
| 2005/0274078 | A1 * | 12/2005 | Gilchrist | E05F 15/42<br>49/360 |
| 2008/0190708 | A1 * | 8/2008 | Fisher | B66B 13/143<br>187/324 |
| 2020/0362613 | A1 * | 11/2020 | Morinaga | B66B 13/08 |
| 2021/0102999 | A1 * | 4/2021 | Hamakubo | G07C 3/00 |
| 2023/0096802 | A1 * | 3/2023 | Patel | E05F 15/643<br>16/93 R |
| 2024/0200379 | A1 * | 6/2024 | Kachari | E05F 15/643 |

* cited by examiner

TELESCOPIC LINEAR OPERATOR

TECHNICAL FIELD

The present disclosure relates to powered door operators for sliding doors, and more particularly to powered door operators for elevator cars.

BACKGROUND

Sliding doors may be opened by powered door operators rather than opened manually. In a common application, powered door operators are used to open the doors of an elevator car. Such elevator door operators include harmonic-type elevator door operators and linear-type door operators, each type of operator having relative advantages and drawbacks. For example, in many applications harmonic operators last longer than linear operators but are harder to install.

SUMMARY

It has been recognized that when linear operators are employed, either for elevator doors or for other types of sliding doors, a first step to installing the operator is to select an operator of appropriate size. That is, to select an operator sized to ensure that the movement of the door by the operator is the movement required to correctly open and close the door. For example, for a side sliding elevator door a linear operator is selected so that the size of the operator along the direction door movement is sufficient to allow the door to fully open when people want to enter or exit the elevator car and to fully close before the elevator car moves between floors. Thus, the installation or replacement of a linear operator carries the burden of acquiring a linear operator of correct size.

It has been further recognized that the burden of acquiring a linear operator of correct size can be alleviated or eliminated by providing a linear operator that is size-adjustable, or "telescopic." A telescopic linear operator may be used in situations requiring varying amounts of door movement, thereby allowing a single telescopic linear operator to serve as substitute for a multiple of non-telescopic linear operators. For instance, an elevator installation and service company may stock one type of telescopic linear operator that can be used for a range of jobs instead of stocking many non-telescopic linear operators in hopes that one of the non-telescopic operators is correctly sized for a given job.

In view of the burden associated with acquiring a correctly sized linear operator for a given application and the desire for adjustable linear operators, the presently discloses technology is provided. The presently disclosed technology includes a telescopic linear operator that may be selectively sized for use in a range of applications.

In accordance with an aspect of the present technology a linear operator for a sliding door includes a body; a first wheel rotatably attached to the body at a first position on the body; an arm movably attached to the body, translatable in a direction parallel or substantially parallel to a longitudinal axis of the body, and fixable to the body at a desired translation position; a second wheel rotatably attached to the arm at a second position on the arm; and a conveyor extending between the first wheel and the second wheel, movable about the first wheel and the second wheel, and operable for attachment to a door, wherein when the arm is at a desired translation position, a distance between the first position and the second position corresponds to a desired movement distance of the door when the door is attached to the conveyor.

BRIEF DESCRIPTION OF THE DRAWINGS

The accompanying drawings are not intended to be drawn to scale. Also, for purposes of clarity not every component may be labeled in every drawing. Further, the same reference numbers in different drawings may identify the same or similar elements.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1A:
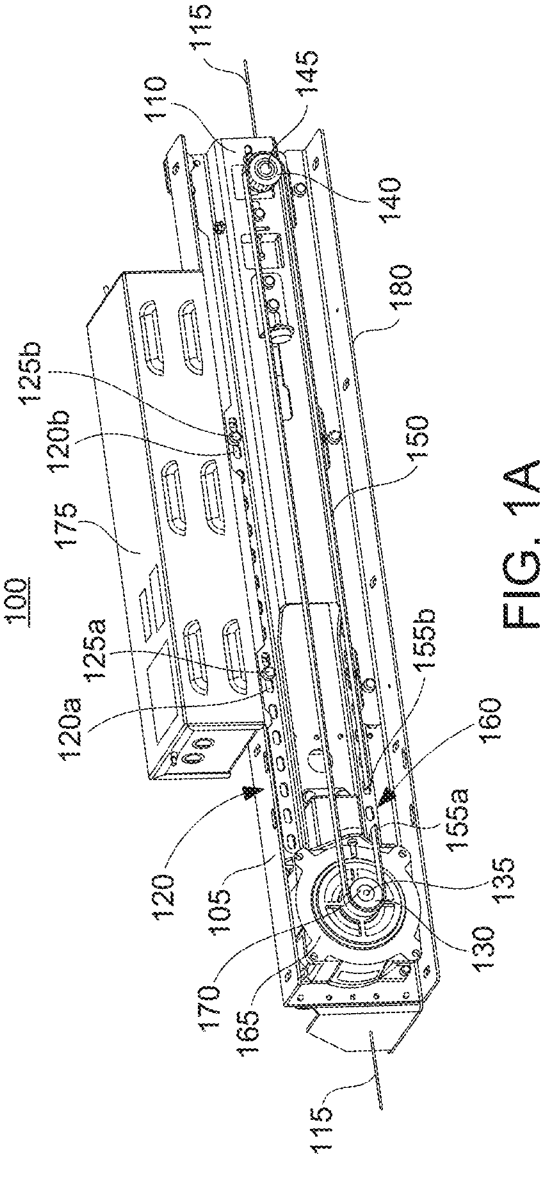
FIG. 1A is a perspective view of a telescopic linear operator in a fully retracted position.

FIG. 1A is a perspective view of a telescopic linear operator 100 in a fully retracted position. The linear operator 100 includes a body 105 and an arm 110. The arm 110 is movably attached to the body 105 such that the arm 110 can translate, or "telescope," in a direction parallel or substantially parallel to a longitudinal axis 115 of the body. In FIG. 1A, the arm 110 is translated toward the body 105 to a maximum extent, thereby placing the arm in a fully retracted position which, in the example of FIG. 1A, places the arm 110 within the bounds of the body 105. As can be further seen from FIG. 1A, the arm 110 includes a multiple of arm through-holes 120, e.g., arm through-holes 120*a* and 120*b*. The body 105 includes a multiple of body through-holes which may be selectively aligned with the arm through-holes 120, although the body through-holes are not visible in FIG. 1A. The arm 110 may be fixed to the body 105 when the arm 110 is in a desired translation position, e.g., the fully retracted position of FIG. 1A, by aligning one or more of the arm through-holes 120 with one or more of the body through-holes and inserting one or more fasteners, e.g., bolts 125*a* and 125*b*, into the aligned through-holes. Moreover, as shown in FIG. 1A the arm through-holes 120 may have an oval shape to allow for an increased range of positions at which the arm 110 is fixable to the body 105.

The linear operator 100 of FIG. 1A further includes a first wheel 130 rotatably attached to the body 105 at a first position 135 on the body 105, a second wheel 140 rotatably attached to the arm 110 at a second position 145 on the arm 110, and a conveyor 150 extending between the first wheel 130 and the second wheel 140. The conveyor 150 is movable about the first wheel 130 and the second wheel 140. In the FIG. 1A configuration, the conveyor 150 has a first end 155*a* and a second end 155*b*, which are configured for attachment to a conveyor clamp (not shown), the conveyor clamp filling a space 160 between the first end 155*a* and the second end 155*b* such that the conveyor 150 and conveyor clamp form a closed loop about the first wheel 130 and the second wheel 140. The conveyor clamp is configured for attachment to a door bracket (not shown) which is, in turn, configured for attachment to a door (not shown). When the conveyor 150 is attached to a door through a conveyor clamp and a door bracket, movement of the conveyor 150 about the first wheel 130 and the second wheel 140 moves the door, and may move the door between a fully opened position and a fully closed position.

It should be noted that, the conveyor 150 may not have a first end 155*a* or a second end 155*b*, and may itself form a closed loop. In such configuration, a conveyor clamp may be attached to the closed loop conveyor, thereby providing an attachment point at which a door may be attached to the conveyor 150 through a door bracket so that the conveyor 150 may move the door. It should be further noted that the conveyor 150 may take many alternative forms. For instance, the conveyor 150 may take the form of a belt, a cable, or a chain.

Still further, it should be noted that one or both of the first wheel 130 and the second wheel 140 may be a sprocket-type wheel. In such case, the conveyor 150 may include grooves or holes for engaging sprocket teeth on the first wheel 130 and/or second wheel 140. In this manner, the conveyor 150 may rotate with the first wheel 130 and/or second wheel 140 without slippage.

Referring back to FIG. 1A, the linear operator 100 may include a motor 165. The motor 165 may drive a shaft 170 that is located at the first position 135 and operates to rotate the first wheel 130, thereby moving the conveyor 150. Thus, the motor 165 may supply the force to move a door coupled to the conveyor 150. In the FIG. 1A arrangement, the shaft 170 is a central axel of the motor 165, however it should be noted that other arrangements are possible. For example, the motor 165 may be offset from the shaft 170 and connected to the shaft 170 through one or more gears. Further, the embodiments are not limited to use of one motor. For example, some embodiments may include two motors, one motor attached to the body 105 and operable to drive the first wheel 130 and a second motor attached to the arm 110 and operable to drive the second wheel 140.

In any event, the linear operator 100 may further include a drive unit 175 for controlling the one or more motors. For example, the drive unit 175 may control motor 165. To this end, the drive unit 175 may include a power supply, electrically connected to the motor 165, and a processor for selectively switching power from the power supply to the motor 165 as needed by the motor 165 to open and close a door operated by operator 100.

In addition, the linear operator 100 may include a base 180. As shown in FIG. 1A, the base 180 may be integral with, or attached to, the body 105. The base 180 is provided to facilitate secure attachment of the linear operator 100 proximate one or more doors to be controlled by the operator 100. For example, the base 180 may be secured to an elevator car door header when the operator is installed to control a door of the elevator car.

Figure 1B:
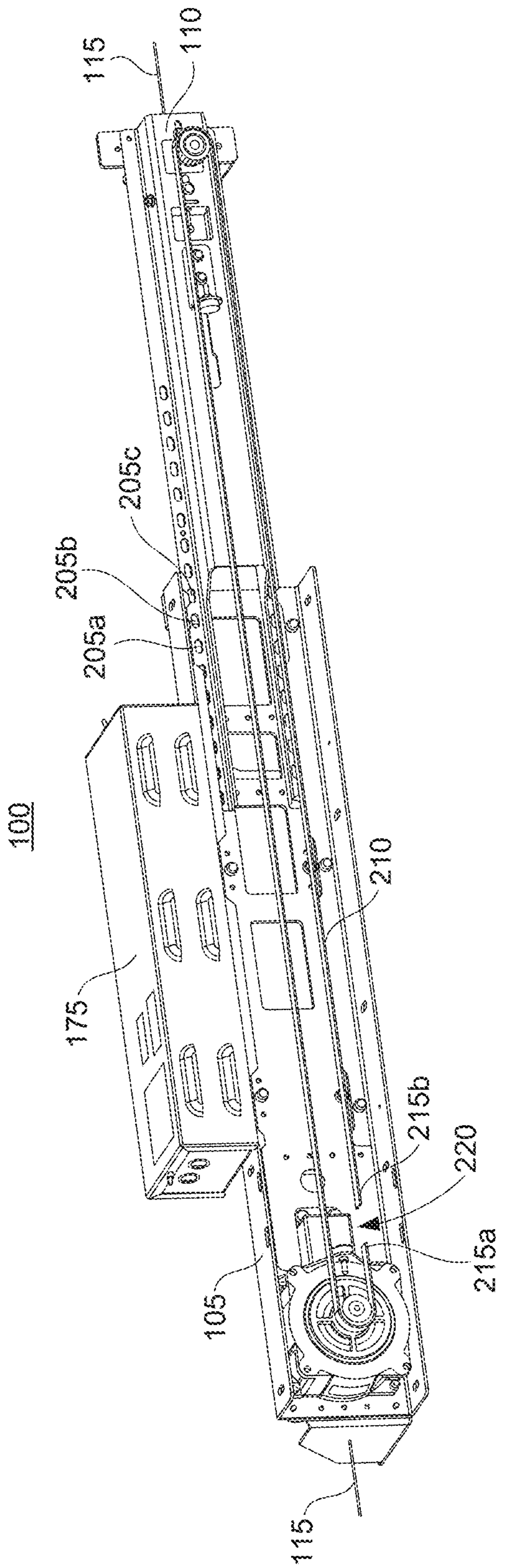
FIG. 1B is a perspective view of the telescopic linear operator of FIG. 1A in a fully extended position.

Turning now to FIG. 1B, the figure shows a perspective view of the telescopic linear operator 100 of FIG. 1A in a fully extended position. FIG. 1B does not show fixation of the linear operator 100 in the fully extended position; however, as can be seen from FIG. 1B, one or more of arm through-holes 205*a*, 205*b*, and 205*c* could be used to fix arm 110 to body 105 in the fully extended position. That is, each of arm through-holes 205*a*, 205*b*, and 205*c* aligns with a corresponding body through-hole, and the arm 110 may be fixed to the body 105 by inserting one or more fasteners in one or more of the aligned through-holes, e.g., by placing a bolt in one of the aligned through-holes and securing the bolt with a nut. Further, in the FIG. 1B configuration a longer conveyor is required to accommodate the increased distance between the first position 135 and the second position 140, and thus in the FIG. 1B configuration the linear operator 100 employs a conveyor 210 which is longer than conveyor 150. Nevertheless, the conveyor 210 may have the same or similar structure as that of conveyor 150. Regardless, the conveyor 210 extends between the first wheel 130 and the second wheel 140, is movable about the first wheel 130 and the second wheel 140, and has a first end 215*a* and a second end 215*b*. The first end 215*a* and the second end 215*b* may be configured for attachment to a conveyor clamp (not shown), the conveyor clamp filling a space 220 between the first end 215*a* and the second end 215*b* such that the conveyor 210 and conveyor clamp form a closed loop about the first wheel 130 and the second wheel 140. The conveyor clamp is configured for attachment to a door bracket (not shown) which is, in turn, configured for attachment to a door (not shown). When the conveyor 210 is attached to a door through a conveyor clamp and a door bracket, movement of the conveyor 210 about the first wheel 130 and the second wheel 140 may move the door between an opened position and a closed position. As compared to the linear operator configuration of FIG. 1A, the linear operator configuration of FIG. 1B provides for a greater range of door movement.

Figure 2:
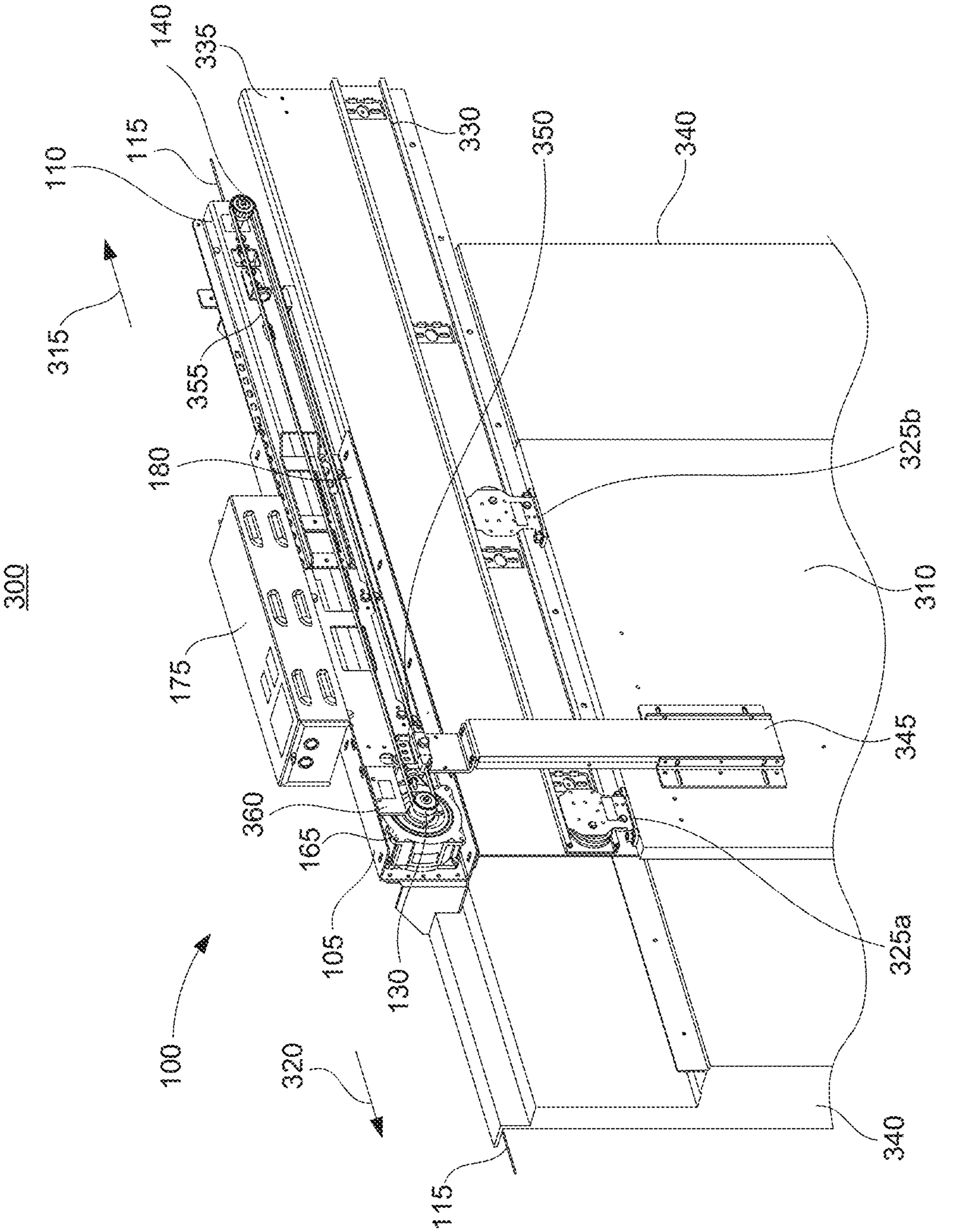
FIG. 2 is a perspective view of the telescopic linear operator of FIGS. 1A and 1B as used in a side sliding elevator car door arrangement.

Turning now to FIG. 2, the figure is a perspective view of the telescopic linear operator 100 of FIGS. 1A and 1B as used in a side sliding elevator car door arrangement 300 of an elevator car. The view of FIG. 2 is from outside the elevator car, looking at the front of the elevator car from inside the elevator hoistway. In the FIG. 2 arrangement the linear operator 100 is secured in a desired translation position that is between the fully retracted position of FIG. 1A and the fully extended position of FIG. 1B. In the FIG. 2 arrangement, the linear operator 100 is configured to move a side sliding door 310 in a closing direction, represented by arrow 315, and in an opening direction, represented by arrow 320, both the closing direction 315 and the opening direction 320 being parallel or substantially parallel to the longitudinal axis 115 of the linear operator 100. The operator 100 may move the door 310 between a fully closed position and a fully opened position. In FIG. 2, the door 310 is shown in the fully opened position.

To allow for movement of the door 310, the door 310 is attached to two rollers 325*a* and 325*b*. The rollers 325*a* and 325*b* are, in turn, positioned within a track 330, and the track 330 is secured to a header 335 of the elevator car, with the header 335 being attached to a car wall 340 of the elevator car. The rollers 325*a* and 325*b* allow the door 310 to move along the direction of the track 330 between the fully closed position and the fully opened position. As can be seen from FIG. 2, when in the fully opened position the door 310 is positioned behind the car wall 340—from the perspective of a viewer inside the car.

To provide the desired movement of the door 310, the linear operator 100 may be oriented parallel to, or substantially parallel to, the track 330 and secured to the header 335. In the FIG. 2 arrangement, the base 180 of the linear operator 100 is secured to the top of the header 335, although other configurations are possible. Further, the door 310 is attached to the linear operator 100 through a door bracket 345 and a conveyor clamp 350, with the conveyor clamp 350 being part of, or attached to, a conveyor 355 of the linear operator 100. When motor 165 rotates the first wheel 130, the first wheel 130 moves the conveyor 355 which, in turn moves the conveyor clamp 350, door bracket 345, and door 310. Rotation of the first wheel 130 in the counterclockwise direction moves the door 310 in the closing direction 315, and rotation of the first wheel 130 in the clockwise direction moves the door 310 in the opening direction 320.

Also shown in FIG. 2 is a gate switch 360 for providing an indication that the door 310 is in the fully closed position. The gate switch 360 may be provided as part of the linear operator 100 or as an attachment to the linear operator 100. In any event, the gate switch 360 may be electrically coupled to the drive unit 175 and activated by a roller (not shown) attached to the conveyor clamp 350. When the roller activates the gate switch 360, the gate switch sends a signal to the drive unit 175 indicating that the door 310 is in the fully closed position. Thereby, providing a failsafe that prevents the elevator car from moving without the door 310 being fully closed.

Figure 3:
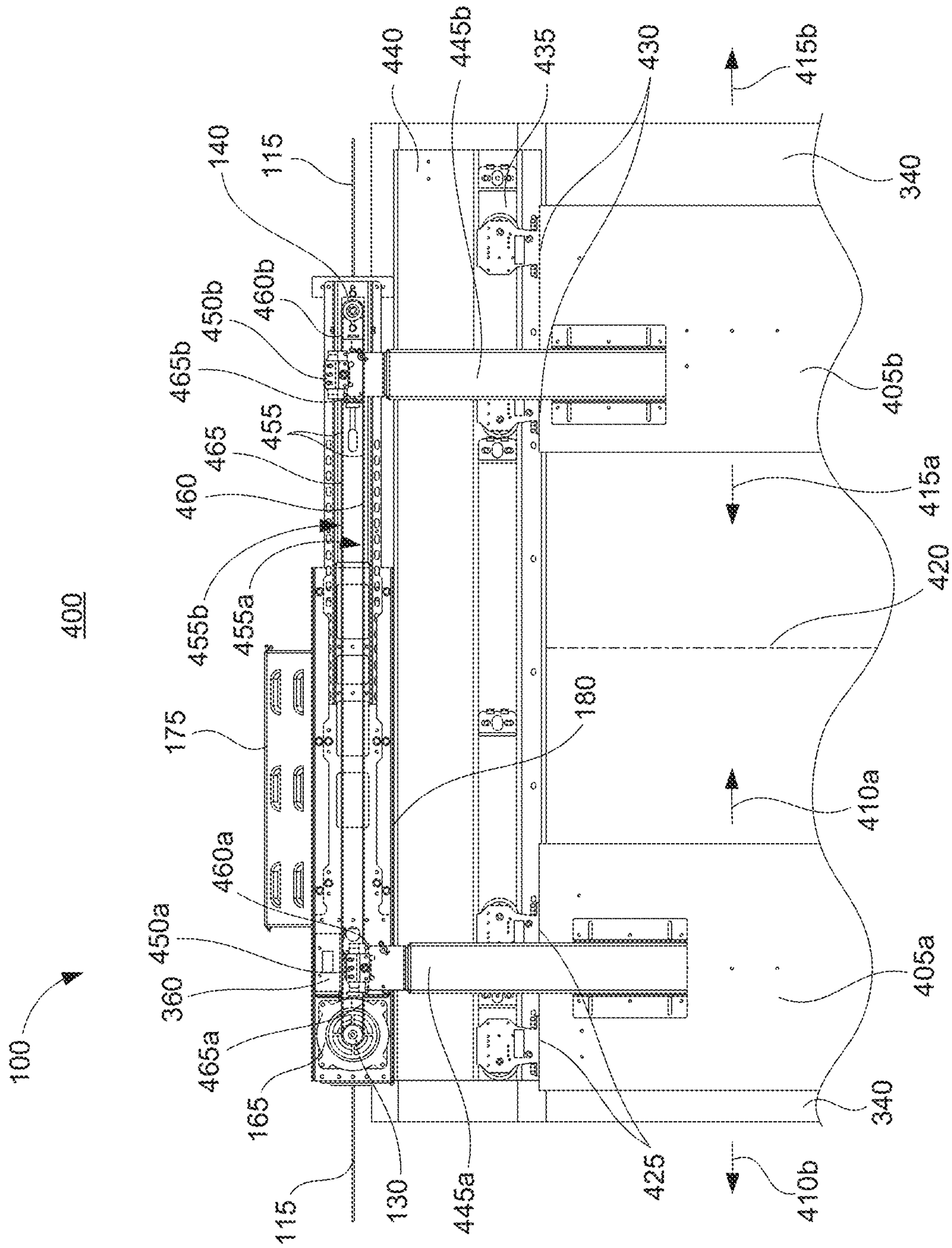
FIG. 3 is a profile view of the telescopic linear operator of FIGS. 1A, 1B, and 2 as used in a center parting elevator car door arrangement.

Referring now to FIG. 3, the figure is a profile view of the telescopic linear operator 100 of FIGS. 1A, 1B, and 2 as used in a center parting elevator car door arrangement 400. The view of FIG. 3 is from outside the elevator car, looking at the front of the elevator car from inside the elevator hoistway. In the FIG. 3 arrangement, the linear operator 100 is secured in a desired translation position that is between the fully retracted position of FIG. 1A and the fully extended position of FIG. 1B. In the FIG. 3 arrangement, the linear operator 100 is configured to move a first elevator car door 405*a* and a second elevator car door 450*b* in respective closing directions and respective opening directions. For the first door 405*a*, the closing direction is represented by arrow 410*a* and the opening direction is represented by arrow 410*b*. For the second door 405*b*, the closing direction is represented by arrow 415*a* and the opening direction is represented by arrow 415*b*. Each of the closing directions 410*a* and 415*a* and the opening directions 410*b* and 415*b* are parallel or substantially parallel to the longitudinal axis 115 of the linear operator 100. The operator 100 may move the doors 405*a* and 405*b* between a fully closed position, represented by dashed line 420, and a fully opened position. In FIG. 3, the doors 405*a* and 405*b* are shown in the fully opened position.

To allow for movement of the doors 405*a* and 405*b*, the doors 405*a* and 405*b* are attached to respective pairs of rollers 425 and 430. The pairs of rollers 425 and 430 are, in turn, positioned within a track 435, and the track 435 is secured to a header 440 of the elevator car, with the header 440 being attached to a car wall (not shown) of the elevator car. The pairs of rollers 425 and 430 respectively allow the doors 405*a* and 405*b* to move along the direction of the track 435 between the fully closed positions of the doors 405*a* and 405*b* and the fully opened positions of the doors 405*a* and 405*b*. Typically, when in the doors 405*a* and 405*b* are in their fully opened positions the doors 405*a* and 405*b* are positioned behind the car wall—from the perspective of a viewer inside the car.

To provide the desired movement of the doors 405*a* and 405*b*, the linear operator 100 may be oriented parallel to, or substantially parallel to, the track 435 and secured to the header 440. In the FIG. 3 arrangement, the base 180 of the linear operator 100 is secured to the top of the header 440, although other configurations are possible. Further, the first door 405*a* is attached to the linear operator 100 through a first door bracket 445*a* and a first conveyor clamp 450*a*, with the first conveyor clamp 450*a* being part of, or attached to, a conveyor 455 of the linear operator 100; and the second door 405*b* is attached to the linear operator 100 through a second door bracket 445*b* and a second conveyor clamp 450*b*, with the second conveyor clamp 450*b* being part of, or attached to, the conveyor 455 of the linear operator 100. Notably, the first conveyor clamp 450*a* is attached to the conveyor 455 at a lower conveyor position 455*a*, and the second conveyor clamp 450*b* is attached to the conveyor 455 at an upper conveyor position 455*b*. In this manner, when motor 165 rotates the first wheel 130 in the counterclockwise direction, the first wheel 130 moves the conveyor 455 such that the conveyor clamp 450*a*, door bracket 445*a*, and door 405*a* move in the closing direction 410*a* of door 405*a*; and such that the conveyor clamp 450*b*, door bracket 445*b*, and door 405*b* move in the closing direction 415*a* of door 405*b*. Similarly, when motor 165 rotates the first wheel 130 in the clockwise direction, the first wheel 130 moves the conveyor 455 such that the conveyor clamp 450*a*, door bracket 445*a*, and door 405*a* move in the opening direction 410*b* of door 405*a*; and such that the conveyor clamp 450*b*, door bracket 445*b*, and door 405*b* move in the opening direction 415*b* of door 405*b*.

In the configuration of FIG. 3, the conveyor 455 is formed of a first portion 460 and a second portion 465. The first portion 460 has a first end 460*a* and a second end 460*b*, and the second portion 465 has a first end 465*a* and a second end 465*b*. The first conveyor clamp 450*a* couples the first end 460*a* of the first portion 460 to the first end 465*a* of the second portion 465. The second conveyor clamp 450*b* couples second end 460*b* of the first portion 460 to the second end 465*b* of the second portion 465.

It should be noted that, the configuration of conveyor 455 as depicted in FIG. 3 is merely illustrative. The conveyor 455 need not be formed of two portions. For example, the conveyor 455 may itself form a closed loop, without the first conveyor clamp 450*a* and the second conveyor clamp 450*b*. In such configuration, first and second conveyor clamps may be attached to the closed loop conveyor 455, with the first conveyor clamp being attached to the conveyor 455 at the lower conveyor position 455*a* and the second conveyor clamp being attached to the conveyor 455 at the upper conveyor position 455*b*. Thereby providing for respective attachment of door brackets 445*a* and 445*b* and doors 405*a* and 405*b* so that the conveyor 455 can move the doors 405*a* and 405*b* in a center parting fashion. Moreover, as in the case of FIGS. 1A, 1B and 2, the conveyor 455 may take many alternative forms, such as the form of a belt, a cable, or a chain.

Embodiments of the present technology include, but are not restricted to, the following.

(1) A linear operator for a sliding door including a body; a first wheel rotatably attached to the body at a first position on the body; an arm movably attached to the body, translatable in a direction parallel or substantially parallel to a longitudinal axis of the body, and fixable to the body at a desired translation position; a second wheel rotatably attached to the arm at a second position on the arm; and a conveyor extending between the first wheel and the second wheel, movable about the first wheel and the second wheel, and operable for attachment to a door, wherein when the arm is at a desired translation position, a distance between the first position and the second position corresponds to a desired movement distance of the door when the door is attached to the conveyor.

(2) The linear operator according to (1), further including a motor for driving the first wheel.

(3) The linear operator according to (2), wherein the motor drives a shaft located at the first position and is operable to rotate the first wheel.

(4) The linear operator according to (2), further including a drive unit for supplying power to the motor.

(5) The linear operator according to (4), wherein the drive unit includes a power supply, and a processor for selectively switching power from the power supply to the motor.

(6) The linear operator according to (1), wherein the body includes a base for attaching the linear operator to a door header.

(7) The linear operator according to (1), wherein the arm includes a plurality of arm through-holes, and the body includes a plurality of body through-holes, the plurality of arm through-holes and the plurality of body through-holes being operable to fix the arm to the body when the arm is in the desired translation position by aligning at least one of the arm through-holes with at least one of the body through-holes and securing one or more fasteners in the aligned through-holes.

(8) The linear operator according to (7), wherein the arm through-holes have an oval shape to allow for an increased range of positions at which the arm is fixable to the body.

(9) The linear operator according to (1), wherein the conveyor is in the form of a closed loop.

(10) The linear operator according (9), wherein the linear operator further includes at least one conveyor clamp coupled to the conveyor.

(11) The linear operator according to (10), wherein the at least one conveyor clamp is configured for attachment to a door bracket, and the door bracket is configured for attachment to the door.

(12) The linear operator according to (1), wherein the conveyor has a first end and a second end, and the linear operator further includes a conveyor clamp for coupling the first end to the second end.

(13) The linear operator according to (12), wherein the conveyor clamp is configured for attachment to a door bracket, and the door bracket is configured for attachment to the door.

(14) The linear operator according to (1), wherein the conveyor includes at least one of a belt, a cable, or a chain.

(15) The linear operator according to (1), wherein at least one of the first wheel and the second wheel is a sprocket-type wheel.

(16) The linear operator according to (1), further including a gate switch.

(17) The linear operator according to (1), wherein the conveyor is in the form of a closed loop, and wherein the linear operator further includes a first conveyor clamp coupled to a lower portion of the conveyor and a second conveyor clamp coupled to an upper portion of the conveyor.

(18) The linear operator according to (17), wherein the first conveyor clamp is configured for attachment to a first door bracket, and the first door bracket is configured for attachment to the door, and wherein the second conveyor clamp is configured for attachment to a second door bracket, and the second door bracket is configured for attachment to a second door.

(19) The linear operator according to (1), wherein the conveyor includes a first portion and a second portion, the first portion having first end and a second end, and the second portion having a first end and a second end, and wherein the linear operator further includes a first conveyor clamp for coupling the first end of the first portion to the first end of the second portion, and a second conveyor clamp for coupling the second end of the first portion to the second end of the second portion.

(20) The linear operator according to (19), wherein the first conveyor clamp is configured for attachment to a first door bracket, and the first door bracket is configured for attachment to the door, and wherein the second conveyor clamp is configured for attachment to a second door bracket, and the second door bracket is configured for attachment to a second door.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A linear operator for a sliding door comprising:

a body configured for attachment to a door header;

a first wheel rotatably attached to the body at a first position on the body;

an arm movably attached to the body such that the arm is movable telescopically in relation to the body and in a direction parallel or substantially parallel to a longitudinal axis of the body and such that the arm is fixable to the body at a desired telescopic position;

a second wheel rotatably attached to the arm at a second position on the arm; and a conveyor extending between the first wheel and the second wheel, movable about the first wheel and the second wheel, and operable for attachment to a door, wherein the arm is set to the desired telescopic position based on a desired movement distance of the door when the door is attached to the conveyor, and wherein movement distance of the door varies in direct proportion to distance between the first position and the second position as arranged by the desired telescopic position.

2. The linear operator according to claim 1, further comprising a motor for driving the first wheel.

3. The linear operator according to claim 2 wherein the motor drives a shaft located at the first position and is operable to rotate the first wheel.

4. The linear operator according to claim 2, further comprising a drive unit for supplying power to the motor.

5. The linear operator according to claim 4, wherein the drive unit comprises a power supply, and a processor for selectively switching power from the power supply to the motor.

6. The linear operator according to claim 1, wherein the body comprises a base for attaching the linear operator to the door header.

7. The linear operator according to claim 1, wherein the arm comprises a plurality of arm through-holes, and the body comprises a plurality of body through-holes, the plurality of arm through-holes and the plurality of body through-holes being operable to fix the arm to the body when the arm is in the desired translation position by aligning at least one of the arm through-holes with at least one of the body through-holes and securing one or more fasteners in the aligned through-holes.

8. The linear operator according to claim 7, wherein the arm through-holes have an oval shape to allow for an increased range of positions at which the arm is fixable to the body.

9. The linear operator according to claim 1, wherein the conveyor is in the form of a closed loop.

10. The linear operator according to claim 9, wherein the linear operator further comprises at least one conveyor clamp coupled to the conveyor.

11. The linear operator according to claim 10, wherein the at least one conveyor clamp is configured for attachment to a door bracket, and the door bracket is configured for attachment to the door.

12. The linear operator according to claim 1, wherein the conveyor has a first end and a second end, and the linear operator further comprises a conveyor clamp for coupling the first end to the second end.

13. The linear operator according to claim 12, wherein the conveyor clamp is configured for attachment to a door bracket, and the door bracket is configured for attachment to the door.

14. The linear operator according to claim 1, wherein the conveyor comprises at least one of a belt, a cable, or a chain.

15. The linear operator according to claim 1, wherein at least one of the first wheel and the second wheel is a sprocket-type wheel.

16. The linear operator according to claim 1, further comprising a gate switch.

17. The linear operator according to claim 1, wherein the conveyor is in the form of a closed loop, and wherein the linear operator further comprises a first conveyor clamp coupled to a lower portion of the conveyor and a second conveyor clamp coupled to an upper portion of the conveyor.

18. The linear operator according to claim 17, wherein the first conveyor clamp is configured for attachment to a first door bracket, and the first door bracket is configured for attachment to the door, and wherein the second conveyor clamp is configured for attachment to a second door bracket, and the second door bracket is configured for attachment to a second door.

19. The linear operator according to claim 1, wherein the conveyor comprises a first portion and a second portion, the first portion having first end and a second end, and the second portion having a first end and a second end, and wherein the linear operator further comprises a first conveyor clamp for coupling the first end of the first portion to the first end of the second portion, and a second conveyor clamp for coupling the second end of the first portion to the second end of the second portion.

20. The linear operator according to claim 19, wherein the first conveyor clamp is configured for attachment to a first door bracket, and the first door bracket is configured for attachment to the door, and wherein the second conveyor clamp is configured for attachment to a second door bracket, and the second door bracket is configured for attachment to a second door.

* * * * *